United States Patent [19]
Grove et al.

[11] 3,777,545
[45] Dec. 11, 1973

[54] METER PROVER APPARATUS AND METHOD

[75] Inventors: Marvin H. Grove; Tommy K. Griffin, both of Houston, Tex.

[73] Assignee: M & J Valve Company, Houston, Tex.

[22] Filed: Sept. 27, 1971

[21] Appl. No.: 183,758

Related U.S. Application Data
[63] Continuation-in-part of Ser. No. 166,727, July 28, 1971, abandoned.

[52] U.S. Cl. .................................................. 73/3
[51] Int. Cl. ............................................ G01f 25/00
[58] Field of Search .................... 73/3; 15/104.06 A; 251/324

[56] References Cited
UNITED STATES PATENTS

| | | | |
|---|---|---|---|
| 3,541,837 | 11/1970 | Davis et al. .................................. | 73/3 |
| 2,755,742 | 7/1956 | Vincent .................... | 15/104.06 A X |
| 3,504,523 | 4/1970 | Layhe .......................................... | 73/3 |
| 3,638,475 | 2/1972 | Grove et al. ................................. | 73/3 |
| 3,423,988 | 1/1969 | Grove et al. ................................. | 73/3 |

FOREIGN PATENTS OR APPLICATIONS

| | | | |
|---|---|---|---|
| 1,201,762 | 8/1970 | Great Britain ............................. | 73/3 |

Primary Examiner—Richard C. Queisser
Assistant Examiner—Daniel M. Yasich
Attorney—Paul D. Flehr et al.

[57] ABSTRACT

A meter prover apparatus and method making use of a metering pipe and an interchange connecting the ends of the pipe. The interchange is characterized by use of a piston-like plunger which fits into a sleeve or barrel interposed in the interchange. Spheres are successively moved through the sleeve and launched into the metering pipe by reciprocation of the plunger. During a meter proving run the plunger is within the barrel and forms an interchange seal. Means can be provided to detect any leakage of liquid past the plunger seal, and also past a sphere which is adjacent to the plunger. In one embodiment the apparatus is arranged with an electrical system for automatic cycling.

8 Claims, 14 Drawing Figures

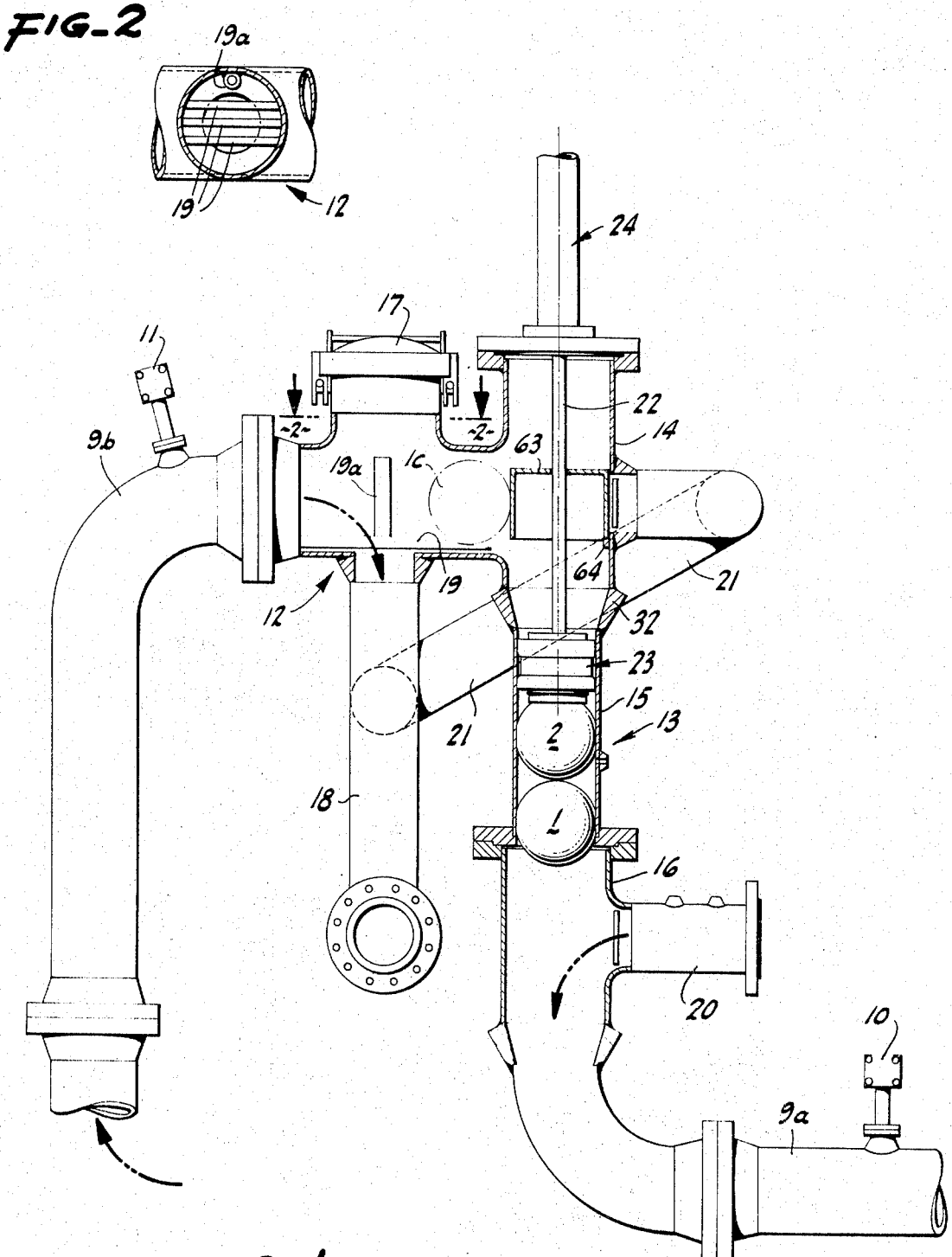

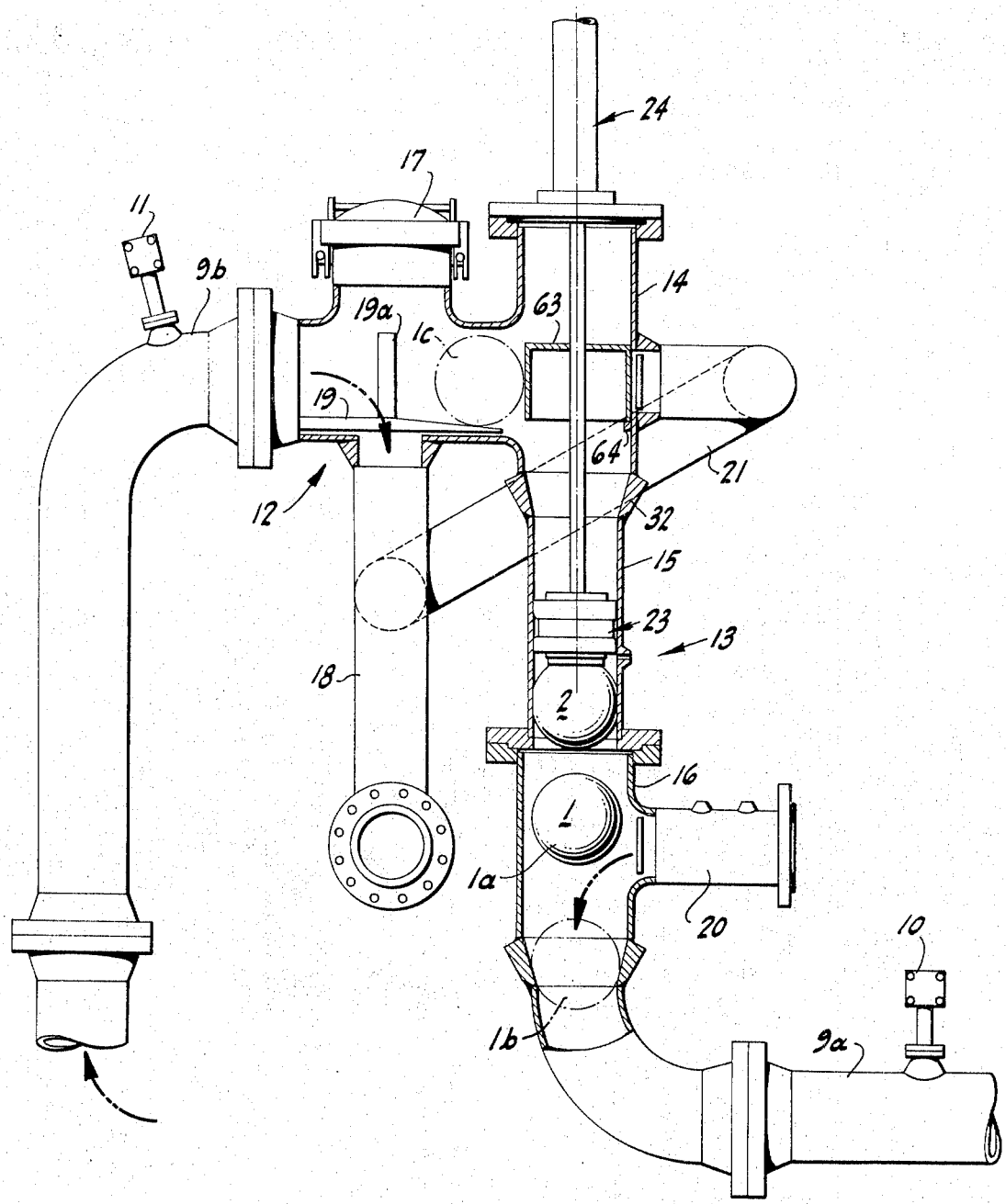
FIG_3

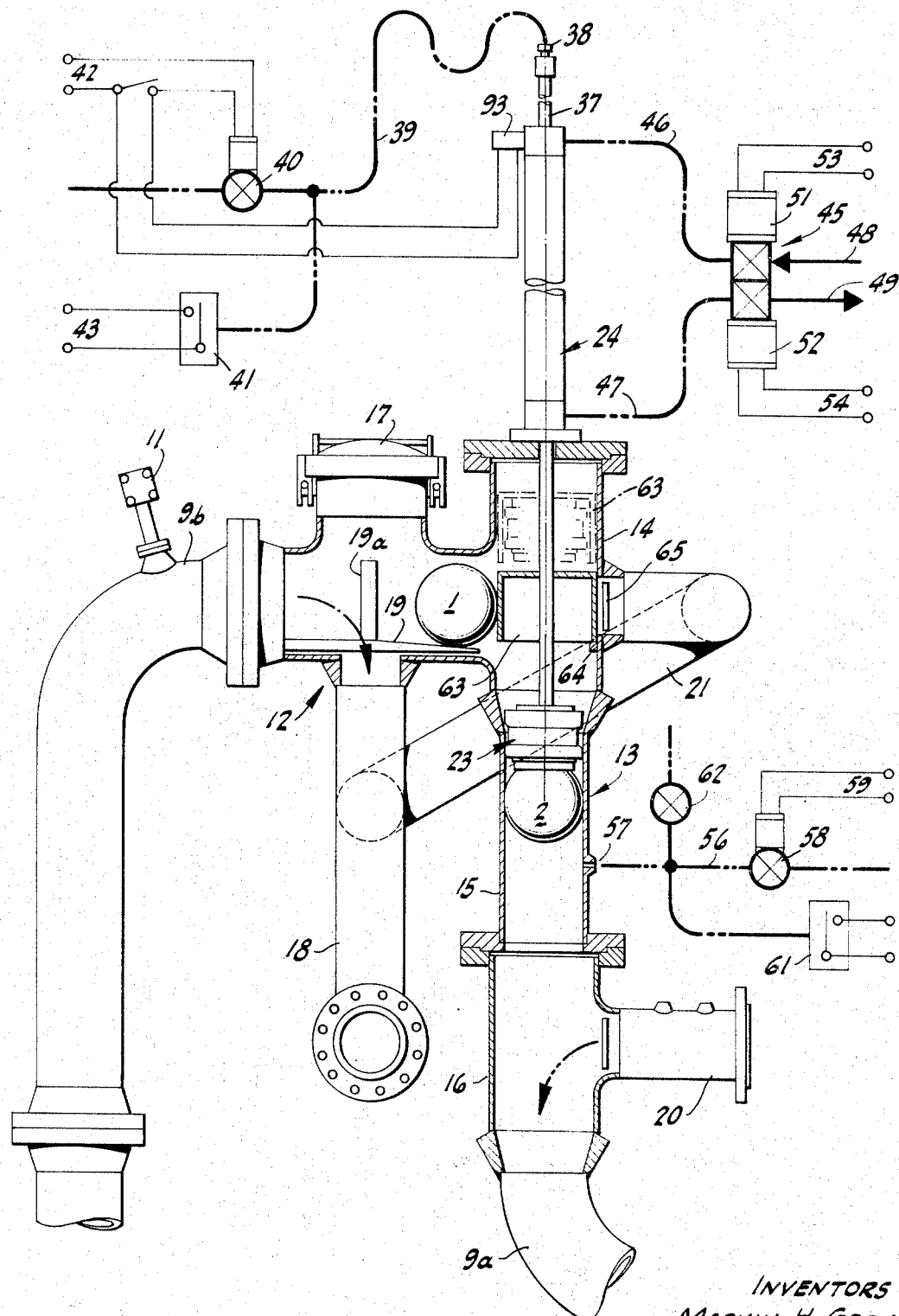
FIG_4

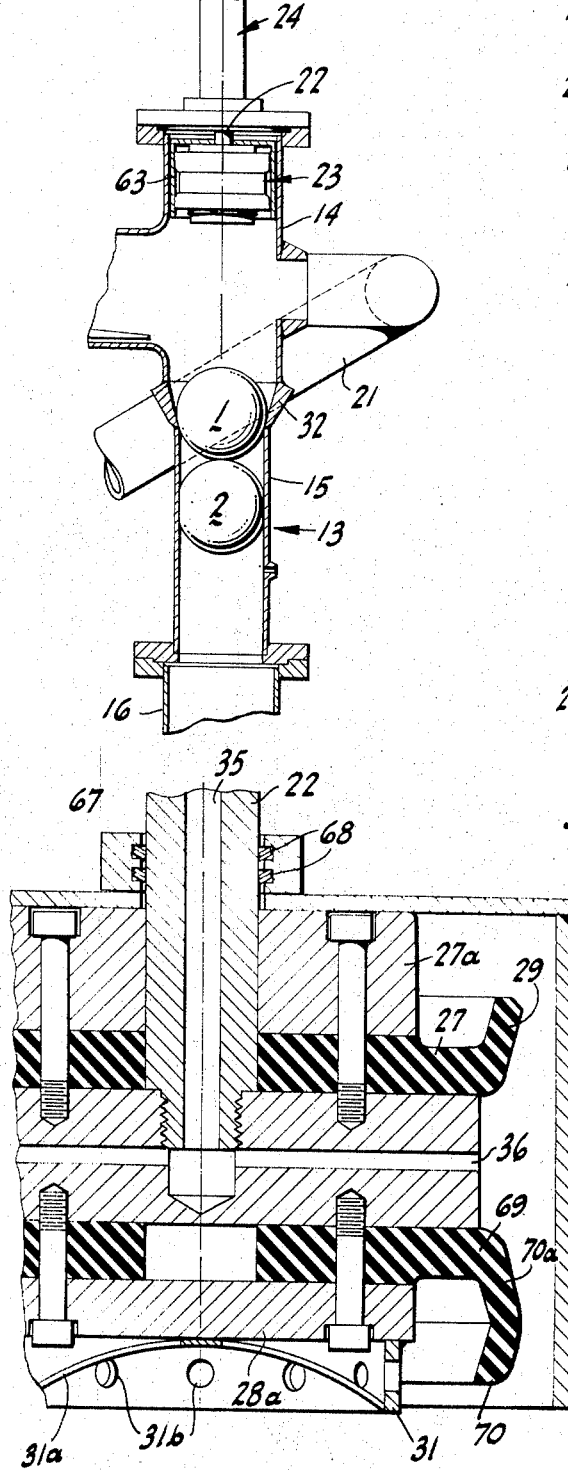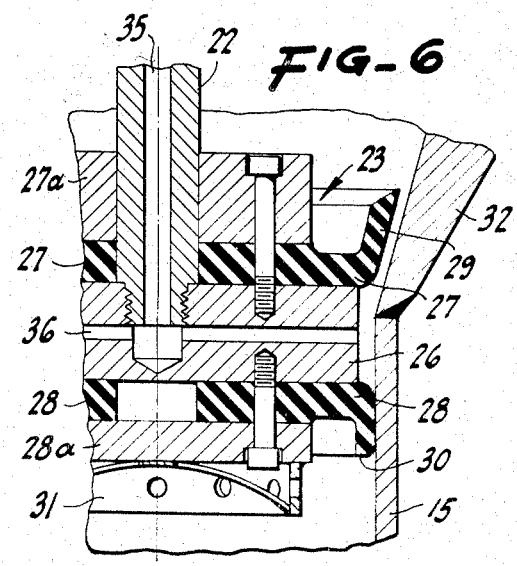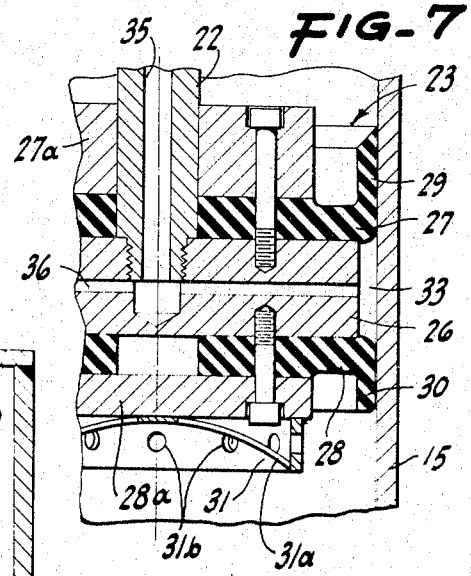

3,777,545

METER PROVER APPARATUS AND METHOD

CROSS-REFERENCE TO RELATED APPLICATION

This application is a continuation-in-part of our pending application Ser. No. 166,727 filed July 28, 1971, now abandoned.

BACKGROUND OF THE INVENTION

This invention relates generally to flow meter proving apparatus and methods such as are employed in conjunction with pipeline transmission systems.

In the installation and operation of pipeline transmission systems for the handling of various liquids, it is recognized that conventional flow metering devices of the positive displacement or turbine types are subject to serious inaccuracies which may be cumulative. Thus it is common to use so-called meter provers which make accurate periodic checks of the flow for calibration of the meter. One conventional form of meter prover consists of an extended length of metering pipe of uniform internal diameter and through which the main flow of the piping system can be directed. Some means is employed to enable a plug or sphere to be launched into the inlet end of the metering pipe whereby it is flow propelled through the pipe to the outlet end, where it is available for relaunching into the inlet end. That part of the apparatus which forms a connection between the inlet and outlet ends of the metering pipe for retrieving a sphere at the end of a metering run and for relaunching it into the inlet end of the metering pipe is commonly known as an interchange. As shown in U.S. Pat. No. 3,387,483, the interchange may make use of valves through which the sphere passes before reaching launching position. By means of an associated electrical system which is activated when the sphere passes through sphere detecting stations near the inlet and outlet ends of the metering pipe, a flow reading is obtained for the time interval which is required for the travel of the sphere between the detecting points. This reading is then taken together with the known calculated volume of the metering pipe between the detecting points to provide accurate calibration data. It has been found important to detect any leakage through the interchange during a metering run. A system making use of leak detecting means is shown in U.S. Pat. No. 3,423,988.

In an effort to simplify the interchange portion of a meter prover apparatus, it has been proposed to make use of three spheres or plugs, with two spheres being at all times within a sleeve interposed in the interchange, whereby during a meter-proving run two spheres provide the interchange seal. When it is desired to launch a sphere from a meter-proving run, a third sphere is moved by mechanical means into the sleeve, with dislodgement of one sphere for commencing the next run. This apparatus has the disadvantage that it requires a minimum of three spheres, and in addition, it relies upon seals between two spheres and the interchange sleeve to maintain a proper seal. Such an arrangement is also vulnerable to accumulation of sludge solids on the uppermost sphere within the interchange sleeve, which interferes with proper movement of the sphere when launched.

SUMMARY OF THE INVENTION AND OBJECTS

It is an object of the present invention to provide a meter prover apparatus and method characterized by simplicity and by use of a piston-like plunger which forms an effective seal for the interchange during a meter-proving run.

Another object of the invention is to provide apparatus and method of the above character which avoids the settling out of sludge solids upon one of the spheres within the interchange.

Another object of the invention is to provide a meter proving apparatus and method which has novel means for detecting any leakage through the interchange while a meter-proving run is being made.

Another object of the invention is to provide a simple system for automatic cycling of the prover.

Another object of the invention is to provide a meter prover apparatus and method which makes use of two spheres, with one sphere being retained in a sleeve provided in the interchange during the period of a run, but without relying however upon the seal between this sphere and the sleeve to prevent leakage through the interchange.

In general, the present invention makes use of a metering pipe having flow inlet and outlet ends and adapted to receive flow propelled spheres. An interchange connects the inlet and outlet ends and includes a sleeve having a diameter such that a sphere may pass through the same with a seal-forming fit. A plunger is provided which is movable from a retracted position spaced axially from the inlet end of the sleeve to a projected position within the sleeve. The length of this sleeve is somewhat greater than enough to accommodate the plunger and two spheres. The plunger preferably is provided with sealing means forming seals with respect to the inner surface of the sleeve on two axially spaced annular areas. The sealing means serves to seal against differential pressures acting from either side of the plunger toward the space between the areas, and preferably is self-relieving with respect to differential pressures acting between said space and the spaces on either side of the plunger. Means is provided for reciprocating the plunger between its retracted and projected positions. When the plunger is retracted a sphere is caused to move to a position adjacent the inlet end of the sleeve, and when the plunger is moved to its projected position within the sleeve, it forces one sphere into the sleeve and launches another sphere into the inlet end of the metering pipe. In one embodiment an electrical system is provided for automatic cycling.

Additional objects and features of the invention will appear from the following description in which the preferred embodiment has been illustrated in conjunction with the accompanying drawing.

BRIEF DESCRIPTION OF THE DRAWING

FIG. 1 is a side elevational view in section illustrating apparatus incorporating the present invention, including the interchange portion and its connections with the inlet and outlet ends of the metering pipe.

FIG. 2 is a detail in cross-section taken along the section line 2—2 of FIG. 1.

FIG. 3 is a view like FIG. 1 but showing parts in different operating position. In FIG. 3 a sphere is being launched into the inlet end of the metering pipe, and the travel of the sphere through the metering pipe and back to the interchange portion is illustrated.

FIG. 4 is a view like FIG. 1 showing the parts in another operating position, particularly illustrating the retraction of the parts from the projected position after a sphere has returned to the interchange.

FIG. 5 is a view like FIG. 1 showing the parts in another operating position. Particularly in this instance the parts as shown in their fully retracted position.

FIG. 6 is an enlarged detail in half section showing the cup-like sealing means for the plunger.

FIG. 7 is a view like FIG. 6 but showing the plunger projected within the interchange sleeve.

FIG. 8 is an enlarged detail in section showing another plunger seal embodiment and another embodiment of the guard means.

DESCRIPTION OF THE PREFERRED EMBODIMENTS

Figure 9:
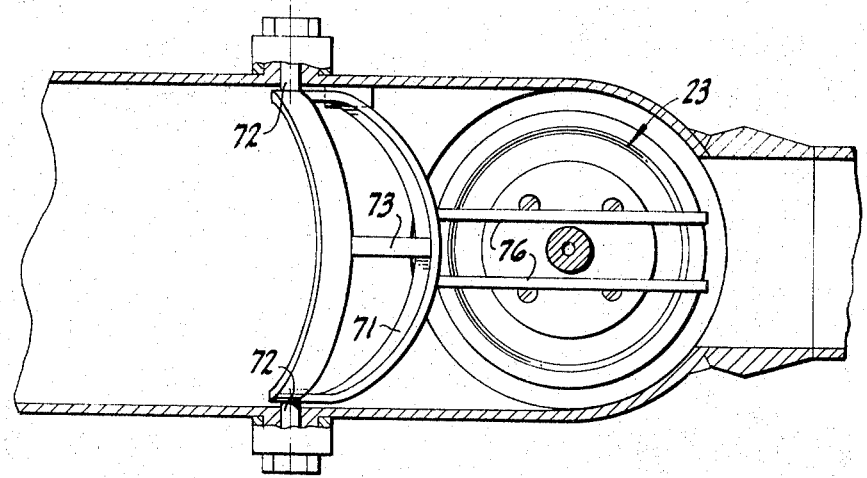
FIG. 9 is a detail in plan and in section showing another sphere guard embodiment.
Figure 10:
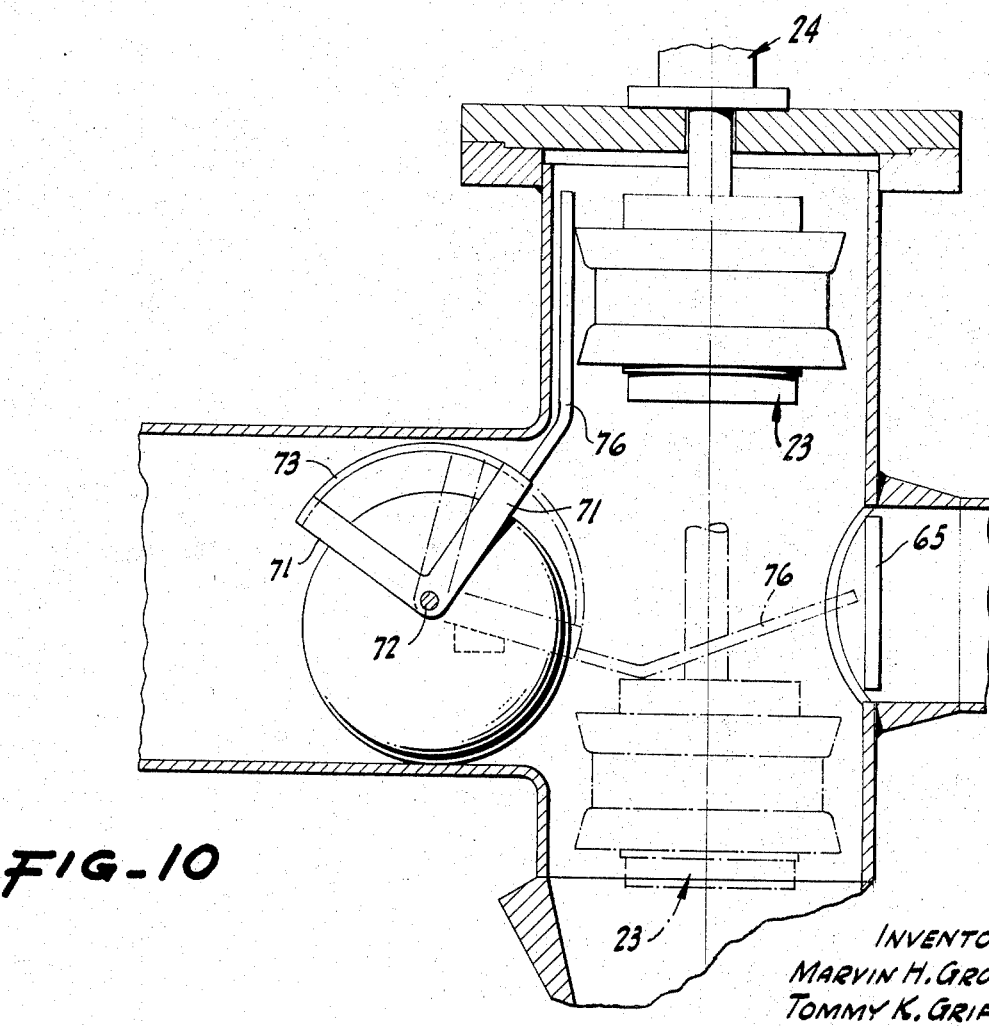
FIG. 10 is a side elevation in section showing the embodiment of FIG. 9.

FIG. 1 shows the inlet and outlet ends 9a and 9b of a metering pipe which may be an extended loop of pipe of uniform internal diameter through which the main flow of a piping system can be directed. The plug or sphere which is flow propelled through this pipe is dimensioned to have a snug fit whereby there is no leakage past the sphere. The sphere is commonly made of resilient material such as synthetic rubber, and has a diameter slightly larger than the internal diameter of the metering pipe. The metering pipe is also provided near its inlet and outlet ends with the sphere detectors 10 and 11 which may be conventional and which, for example, may consist of an electrical switch which is operated when the sphere contacts a sensing element of the detector. The ends of the metering pipe are interconnected by the flow-tee 12 and interchange 13, which in this instance includes tee 14, sleeve 15 and tee 16.

The flow-tee 12 is provided with a removable access cover 17 through which spheres can be introduced or removed. Also its lower side connects with the pipe 18 through which liquid is discharged as it leaves the outlet end of the metering pipe. Barrier bars 19 are provided and have their upper edges inclined to form ramps sloped downwardly toward the tee 14. The purpose of these ramps is to ensure rolling movement of a sphere by gravity within the tee 12 toward the right as viewed in FIG. 1. As will be presently explained, the tee 12 may in some instances be inclined to promote movement of spheres through the same and into the upper portion of the interchange. The tee 14, which forms one end portion of the interchange 13, directly connects with tee 12 and also with the sleeve 15. The other end of sleeve 15 makes direct connection with tee 16 which connects with the inlet end 9a of the metering pipe and also has a side connection to the main flow inlet pipe 20. A bypass line 21 provides fluid communication between the tee 14 and the outlet pipe 18 and prevents fluid in the interchange in front of the returning sphere from impeding movement of the sphere beyond the upper inlet opening of pipe 18 and into the interchange. The diameter of this line may be comparable to that of pipe 18.

It has been observed that spheres tend to dwell when in a position directly over the upper end of pipe 18. This tendency can be prevented by a rib or bar 19a (FIG. 2) which is fixed on the inner surface of one side of tee 12 and along-side the upper open end of pipe 18. A sphere passing through the tee is deflected off center by rib 19a, whereby it cannot dwell directly over the upper open end of pipe 18.

It is generally desirable to construct the interchange 13 whereby the sleeve 15 extends vertically or in an upright position. However, as will be presently explained, the prover can be adapted for horizontal positioning of the interchange. The internal diameter of sleeve 15 can be about the same as the internal diameter of the metering pipe whereby when a sphere is moved into the sleeve its surfaces provide sealing contact with the inner surfaces of the sleeve.

The tee 14 serves to mount a rod 22 which carries a piston-like plunger 23 at its inner end. The exterior end of rod 22 is connected with suitable means to effect its reciprocation in a controlled manner. This may be a power operator 24 of the cylinder-piston type operated hydraulically.

Simple but effective sealing means for the plunger 23 is shown in FIGS. 6 and 7. In this instance a metal disk 26 is shown fixed to the inner end of the operating rod 22, and this disk carries the resilient sealing members 27 and 28. The members 27 and 28 are formed cuplike, thus providing resilient annular sealing skirts 29 and 30. Members 27 and 28 are clamped against the faces of disk 26 by annular clamping members 27a and 28a, the latter being provided with an annular sphere engaging member 31. The lower edge of member 31 is adapted to engage and exert downward thrust on an underlying sphere. To insure absence of any substantial sphere distortion, which may cause sticking of a sphere, arcuate metal straps 31a (e.g., two straps spaced 90° apart) are secured to the plunger within ring 31, and these straps are shaped to provide even contact with a sphere over the upper sphere area surrounded by ring 31. Thus force against the sphere is distributed evenly over a substantial area of the sphere to avoid any substantial sphere distortion. Vent openings 31b in ring 31 avoid any tendency for a sphere to sling against ring 31 due to suction effects.

Resilient sealing members of the type shown are commonly used on pipe scrapers and are known as scraper cups. For the position of the plunger shown in FIG. 6, the lower member 28 seals against pressure applied to the lower side of the plunger, but does not seal against differential pressure applied to the upper side of the plunger. The tapered entrant section 32 immediately above the upper end of the sleeve 15 facilitates entrance of the sealing member 28 into the sleeve when the plunger is moved downwardly toward the sleeve from a raised or retracted position.

When the plunger is in the position shown in FIG. 7, the upper sealing member 27 seals against pressure applied to its upper side, thus preventing any leakage through the interchange during a meter proving run.

A sealing arrangement as described above is self-relieving, particularly in that if pressure should exist in the space 33 between the two sealing members which is greater than the pressure above or below the plunger, then such pressure is relieved past one or other of the sealing members. However, this self-relieving action is possible only when the differential applied from space 33 is sufficient to disrupt the sealing engagement of one of the sealing members 27 or 28 with respect to the inner surface of the sleeve 15.

For purposes of leak detection, duct means is provided for establishing communication between space 33 and means provided exterior of the interchange. Thus a duct 35 extends through the rod 22 and is in communication with a duct 36 in the disk 26, the latter being in communication with space 33. Assuming that the operator 24 is of the hydraulic type consisting of a double-acting cylinder-piston, the extension 37 of the piston rod may carry a gland 38 to which connection can be made to a line 39 to establish connection with the ducts 35 and 36.

When the plunger 23 is within the sleeve 15 as shown for example in FIG. 4, leakage past the plunger can be detected by venting the space 33 to the atmosphere, after which any rise in pressure due to leakage is detected. Thus the line 39 connected to gland 38 can be connected to a solenoid-operated vent valve 40 which, when energized by circuit 42, serves to vent the space 33 to atmosphere through the ducts 35 and 36. After a short venting interval, the solenoid valve is closed and any rise in pressure detected by a pressure sensitive device likewise in communication with line 39. Such a device may be the pressure operated switch 41 which likewise has a fluid connection with line 39. The energizing circuit 42 for the solenoid valve 40 may lead to a remote station where a control switch is provided. Likewise the circuit 43 closed by the pressure switch 41 may lead to the same station and serve to operate a visual indicator.

FIG. 4 also schematically shows hydraulic means connected to energize the hydraulic operator 24. It consists of a four-way control valve 45 which has ports connected by lines 46 and 47 with the ends of the hydraulic cylinder. One port of this valve is connected with line 48 which supplies hydraulic liquid under pressure, and another port is connected with line 49 which serves to exhaust liquid back to the source of pressure. Such a four-way valve may be operated manually or from a remote point by suitable energizing means such as the solenoids 51 and 52. The energizing circuits 53 and 54 for the solenoids 51 and 52 may lead to a suitable control panel where control switches are provided.

As will be presently explained in greater detail, in some instances it is desirable to provide additional leak detecting means for the purpose of detecting leakage past a sphere within the sleeve 15 and immediately underlying the piston 23. For this purpose a vent line 56 connects with the interior of the sleeve through a fitting 57 and is shown controlled by the additional solenoid operated vent valve 58. The energizing circuit 59 for this vent valve may likewise extend to a remote point where a control switch is provided. Likewise line 56 is shown connected with the pressure-operated switch 61 which functions in the same manner as the pressure-operated switch 41. Pipe 56 may also connect with a supply of liquid through valve 62 whereby under certain conditions introduction of liquid into the space between the sphere and the plunger can be employed to prevent upward movement of the sphere by suction action. For the higher differential pressures vent valve 58 may vent to an intermediate pressure above atmosphere, in which event pressure switch 61 is set to indicate a pressure build-up somewhat above the intermediate pressure.

Guard means is provided to prevent movement of a sphere into a position within the path of travel of the plunger when the plunger is retracted to permit a sphere to move to the inlet end of sleeve 15. In the form shown in FIGS. 1, 3 and 4, the guard means is in the form of an inverted bucket or cup 63 which is slidably carried by rod 22 and adapted to rest on lug 64 when the plunger 23 is in semi or full projected position. The inner diameter of cup 63 is sufficient to accommodate the plunger 23, whereby when the plunger is retracted it is received within the cup and thereafter raises the cup to the retracted position shown in FIG. 5. The guard 63 when in its lower position effectively blocks movement of a sphere into a position where it is in the path of movement of the plunger and therefore its blocking action ensures plunger movement without interference. The blocking action of guard 63 is shown in FIG. 3.

The opening 21 may be obstructed by one or more bars 65 to prevent blocking of this opening by a sphere.

Operation of the apparatus described above and carrying out the method of this invention is as follows. It is assumed that two spheres are being used, numbered 1 and 2, and that line flow is occurring through pipe 20. As previously mentioned, the spheres are made of resilient material and they are slightly larger in diameter than the internal diameter of the metering pipe and of the sleeve 15. Immediately before launching a sphere, the two spheres may be located as illustrated in FIG. 1, with sphere 1 located in the lower end of the sleeve 15 and sphere 2 immediately overlying sphere 1. The plunger 23 at this time may be immediately overlying the sphere 2, with its lower sealing member 28 within the upper portion of the sleeve. To launch sphere 1 for the purpose of commencing a meter-proving run, the hydraulic operator 24 is energized by operating the four-way control valve 45 whereby the piston 23 progresses downwardly to move sphere 1 into a position where the flow from line 20 urges it downwardly into inlet end 9a of the metering pipe. The downward movement of the piston 23 may terminate when it reaches a position substantially as shown in FIG. 3. FIG. 3 shows sphere 1 in position to be launched downwardly by the force of flow from the pipe 20. In this figure the sphere 1 is also shown in dotted form at positions 1a, 1b and 1c to illustrate the travel of the sphere through the metering pipe and back to the interchange. The metering run actually commences when sphere 1 actuates the sphere detector 10, and terminates when the sphere has reached and actuated the sphere detector 11. After actuating the detector 11, sphere 1 continues into the flow-tee 12 where it is urged over the ramp bars to take a position against the guard 63, as shown at 1c in FIG. 3.

To place the sphere 1 into the position occupied by the sphere 2 in FIG. 1, the hydraulic operator is actuated to raise the plunger out of the sleeve 15. As the plunger is moved upwardly from the position shown in FIG. 3, suction on the underlying sphere 2 causes this sphere to raise to a position substantially as shown in FIG. 4. As the plunger continues to move upwardly, it engages and moves the guard 63 out of the way of the incoming sphere as indicated in dotted lines in FIG. 4. Further movement of the plunger 23 and guard 63 to the upper limit from the position shown in FIG. 4 permits the sphere 1 to move by gravity and liquid flow into a position in engagement with the upper end of the sleeve 15 as shown in FIG. 5. Thereafter, downward movement of the plunger from the retracted position shown in FIG. 4 to the position shown in FIG. 1 serves to position the spheres 1 and 2 as shown in FIG. 1, except that the spheres have been reversed.

Differential pressure tending to cause leakage through the interchange 13 is in effect the pressure drop between the lines 20 and 18. During the actual meter run, the plunger 23 is well within the sleeve 15 as shown in FIG. 4, and therefore its upper cup-like member 27 forms an effective seal which is independent of the seal between the underlying sphere and the side surfaces of the sleeve. Before a sphere has been launched in the manner illustrated in FIG. 3, the operator may determine whether any leakage is occurring past the piston. As previously explained, this leakage check can be carried out by momentarily operating the solenoid vent valve 40, followed by noting any rise in pressure as shown by the indicator connected to switch 41. Such a check for possible leakage can be completed before the sphere is launched and well before the launched sphere reaches the first sphere detector 10. Also a leakage check can be carried out by operating the vent valve 58 to vent the space between the spheres, following which the operator notes the indicator connected to the pressure switch 61. Any leakage past a sphere while within the sleeve 15 will show that the sphere has become worn and is no longer making a proper seal with either the inner surfaces of the sleeve 15, or the inner surfaces of the metering pipe. This may require repair or replacement of the sphere.

It is deemed evident that the apparatus and method described above has a number of advantages and features. The construction of the apparatus is relatively simple, and likewise the manipulation of the apparatus to carry out successive meter-proving runs is relatively simple and can be carried out by either manual or automated control. During a proving run a positive seal is maintained between the plunger 23 and the sleeve 15, instead of relying upon a seal between the sphere and this sleeve. Simple means is provided for leak detection, including both leakage past the piston 23 and leakage past an underlying sphere.

During most of the operating phases of the apparatus, including the idle position shown in FIG. 1, a part or all of the plunger 23 is within the upper portion of the sleeve 15 overlying one or more spheres, and therefore any sediment tending to accumulate in the upper portion of the interchange does not collect directly upon the uppermost sphere. Accumulation of sediment on one of the spheres is undesirable in that it may interfere with proper movement of the sphere through the metering pipe and may cause leakage between the sphere and the surfaces of the pipe. The plunger 23 not only functions to carry out a cycle of operation in which the spheres are successively launched, but in addition it causes re-positioning of one of the spheres by applying suction to an underlying sphere during its upward movement in the manner previously explained in connection with FIG. 5. Such suction automatically discontinues when the upper sealing member 27 no longer engages the sleeve 15 (e.g., as in FIG. 6) whereby upward movement of an underlying sphere being subjected to suction forces terminates with the sphere in a proper position near the upper end of the sleeve.

Either or both of the spheres can be removed from the interchange for inspection, replacement or other desired purposes. When one of the spheres is resting against the guard 63, as illustrated by the position 1c in FIG. 2, it can be lifted out through the opening in the tee 12 which is normally closed by the cover 17. After the first sphere has been removed and the cover has been replaced, the liquid can be admitted (e.g., through valve 62) between the second sphere and the plunger 23. This prevents the second sphere from being drawn upwardly when the plunger is moved to its retracted position, since the region above the sphere is filled with liquid, and the next down stroke of the plunger causes the sphere to be launched and passed through the metering pipe. When this sphere comes to rest against the guard 63, it can be removed from the interchange in the same manner as the first sphere.

The sphere guard 63 as described in the preceding embodiment is loosely retained upon the plunger rod 22. In instances where the interchange may be mounted on an incline or even horizontally, gravity cannot be relied upon to cause the guard means to assume a proper sphere blocking position when the plunger is moved toward the sleeve 15. In the embodiment of FIG. 8, the sphere guard 66 is substantially in the same form as the guard 63 but cooperates with a collar 67 which is fitted for sliding movement upon the rod 22. Suitable means such as O-rings made of a resilient material like nylon or stacked and dished nylon annuluses 68 are carried by the collar and frictionally engage the surface of the rod 22. By means of such an arrangement, sufficient force is applied to the guard when rod 22 is reciprocated to cause the guard to be moved toward sleeve 15 until it engages the stop means 64.

FIG. 8 also shows a lower seal member 69 of modified construction. It has a portion 70 that is integral with or cemented to member 70. Thus the annular portion 70a consists of two joined frusto-conical annular walls which facilitate entrance into sleeve 15.

Another type of guard means is shown in FIG. 9. In this instance arcuate or bow-shaped members 71 are pivotally carried by the side walls of the flow-tee 12, as by pivot bolts 72, and these members are connected by one or more arcuate members 73. Extension levers 76 are shown secured to one of the members 73, and are adapted to assume either one of the two positions illustrated in FIG. 9, one being in solid lines and the other being dotted. When the plunger 23 is in the position shown in dotted lines in FIG. 9, levers 76 assume a lowered position immediately overlying and engaging the plunger, and one of the members 71 in conjunction with the arcuate member 73 forms an obstruction which blocks movement of a sphere. When the plunger 23 is retracted to its fully raised position shown in solid lines, the levers 76 are likewise raised to the position shown in solid lines, and in this position the device no longer blocks the sphere.

Figure 11:
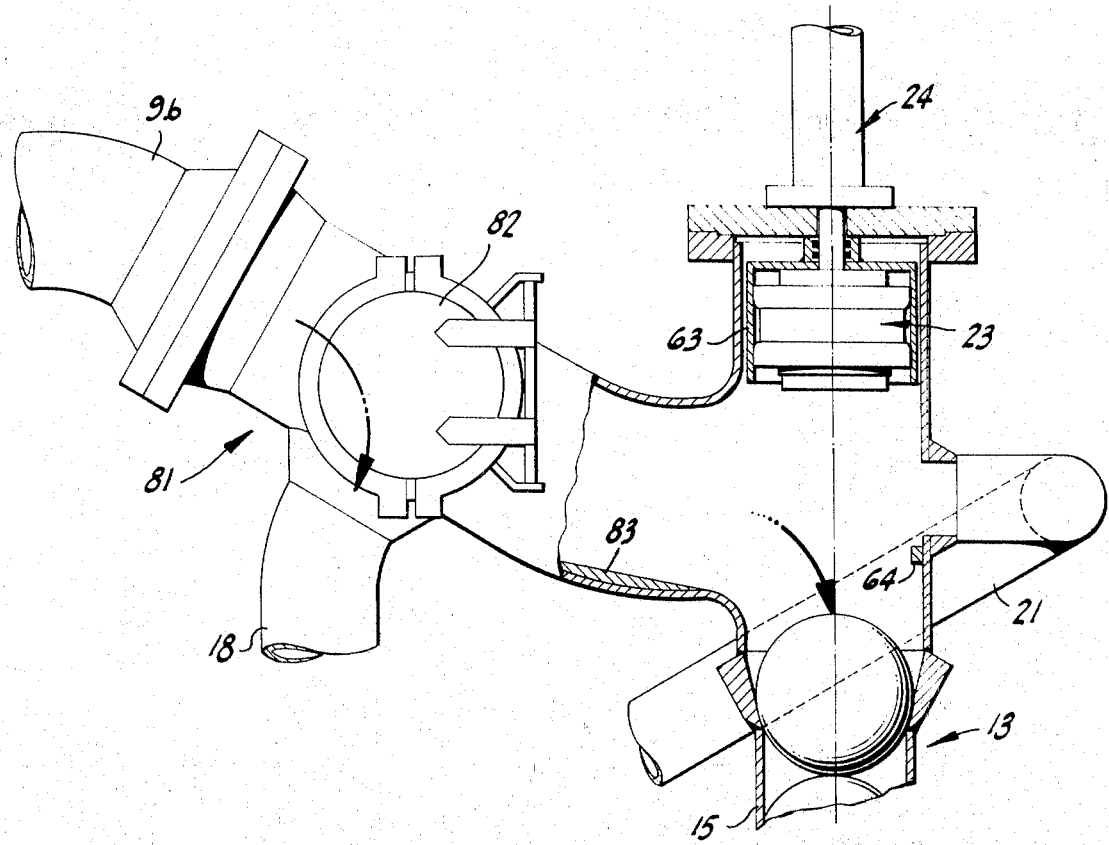
FIG. 11 is a detail in side elevation and partly in section showing an embodiment in which the flow-tee at the outlet end of the metering pipe is inclined.

In some instances it is desirable to provide a flow-tee 12 which is inclined rather than horizontal. Such an arrangement is shown in FIG. 11. The flow-tee 81 in this instance has a removable side closure 82, and a lower opening which connects with the pipe 18. Suitable ramp bars (not shown) are positioned within the flow-tee to prevent a sphere from entering the pipe 18.

Sloped ramp bars 83 may be provided to urge spheres toward the interchange.

The apparatus described above may be automated by the use of suitable electrical circuitry. The suitable circuitry shown in FIG. 12 incorporates a relay R which has two switches S1 and S2 having blades operated by the common winding 86. The circuit 53 indicated in FIG. 4 has its one side connected to contact 1 of switch S1, and its other side connected to the current supply line L1. The circuit 54 indicated in FIG. 4 has its one side connected with contact 2 of switch S1 and its other side connected to line L1. The blades of switches S1 and S2 are connected together to the line L2. Winding 86 is connected in series with a start switch 87, and the lines L1 and L2. Switch 88 represents the contacts of the second sphere detector, and it is connected on one side to line L1 and its other side connected to contact 2 of switch S2 in series with the resistor 89. To complete a holding circuit for the relay R, a diode 91 is shown connected between one side of the winding 86 and the switch 88. An additional switch 92 can serve as a reset switch, and may be manually operated. Circuit 59 from the vent valve 58 of FIG. 4 is extended and connected to lines L1 and L2 and provided with a controlling switch 93. For automatic operation, this switch is associated with the operator rod 37 (FIG. 4) and is operated as the rod and the plunger are moved through a predetermined intermediate position. Lines L1 and L2 represent a direct current source of suitable voltage.

Figure 12:
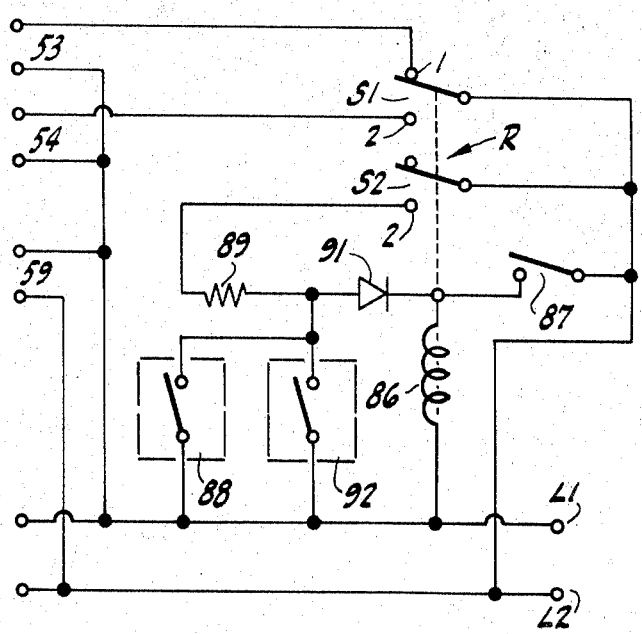
FIG. 12 is a circuit diagram of electrical means for automatic cycling.

Taking FIG. 12 together with FIG. 4, automatic operation is as follows. It is assumed that the plunger 23 is in a fully raised or fully retracted start position, at which time the circuit 53 to solenoid 51 is closed, since the blade of switch S1 is closed upon contact 1. To start a cycle the operator momentarily closes switch 87, whereby the winding 86 of relay R is energized and the relay closed. Switch S1 is thereby opened to open the solenoid circuit 53, and the closing of the blade of switch S1 on contact 2 closes circuit 54, whereby solenoid 52 is energized to initiate movement of the plunger 23 toward the sleeve 15. The closing of switch S2 of relay R establishes a holding circuit for the relay through resistor 89 and diode 92. As the plunger 23 moves downwardly, it engages the uppermost of the two spheres, and the spheres then move together along the sleeve 15. When the plunger has reached a position as shown in FIG. 1, with both of its sealing cups within the sleeve 15, the switch 93 on the plunger operator is actuated, thereby momentarily closing circuit 59 to the vent valve 58. This vents the space 33 between the two sealing cups to atmosphere, and after the vent valve has been closed, any rise in pressure is detected by the pressure switch 61. This leak detection operation is carried out while the plunger is moving downwardly, and before the lowermost sphere within the sleeve has been launched. The plunger 23 continues to move downwardly and to effect launching of the lowermost sphere from the sleeve, and the plunger reaches its lowermost or fully projected position. The launched sphere thereupon commences a meter-proving cycle and is flow propelled through the metering pipe. The sphere detector 11 is provided with a set of contacts corresponding to the contacts 88 of FIG. 12. Closing of these contacts at the end of the proving run establishes a short circuit about the relay winding 86, thereby causing this relay to be de-energized and to return to its initial condition as shown in FIG. 12. Thus contact 2 of switch S1 is opened to de-energize the solenoid circuit 54 and switch S1 closes on contact 1, thereby closing circuit 53 to solenoid 51, whereby the hydraulic operator is reversed to move the plunger back to its initial retracted position. If during a cycle of operation it is desired to reset the plunger back to its initial fully retracted position, the switch 92 is closed, which in effect provides a bypass about the switch 88.

It is evident that when the circuitry of FIG. 12 is employed together with the apparatus as shown in FIG. 4, the apparatus is fully automated and carries out a meter-proving cycle together with a leak detection operation without manual intervention. Switch 87 may be located at a remote point, together with leak indicating means and the reset switch 92. Also suitable indicating means can be provided at the remote station for showing the position of the plunger.

Figure 13:
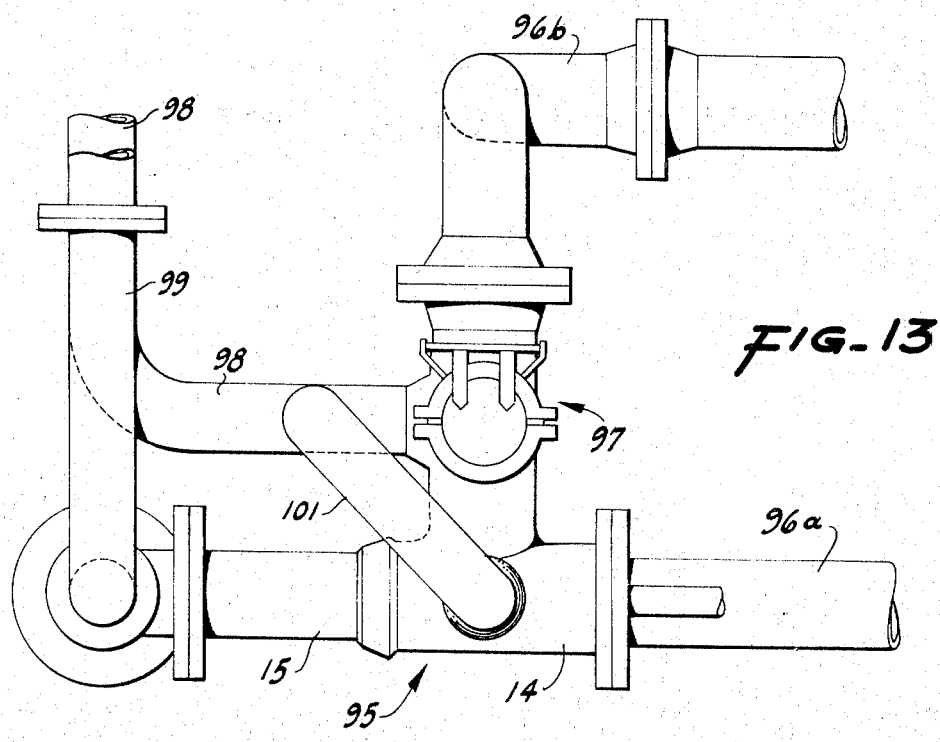
FIGS. 13 and 14 are plan and side elevational views of an embodiment in which the interchange is horizontal.
Figure 14:
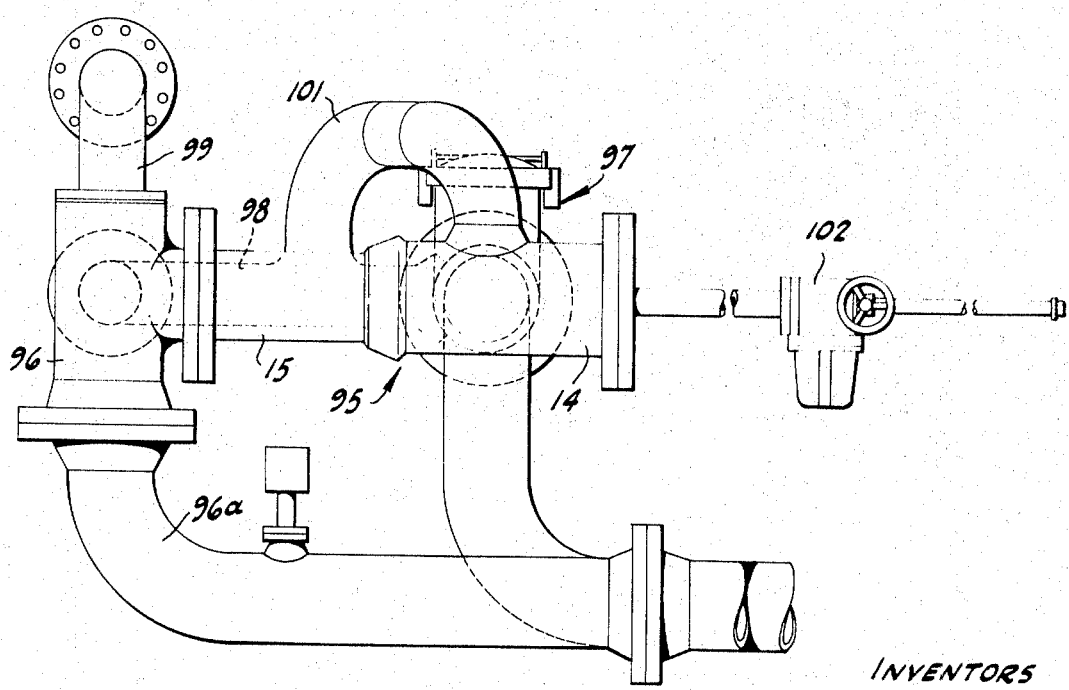

FIGS. 13 and 14 illustrate a meter prover incorporating the present invention, which has its interchange 95 disposed horizontally. One end portion of this interchange connects with the tee 96 which in turn connects with the inlet end 96a of the meter proving pipe. The other end portion of the interchange connects with the flow-tee 97 which makes connection with the pipe 98 through which liquid is discharged to the line after passing through the metering pipe. The outlet 96b of the metering pipe also connects with the flow-tee 97. Liquid enters the inlet end 96a of the metering pipe by way of pipe 99 and tee 96. The bypass pipe 101 corresponds to the pipe 21 of FIG. 1. The interchange 95 is provided with a plunger 23 the same as in FIG. 1. However, in this instance electrical operating means 102 is shown operatively connected to the extended operating rod of the plunger. With this embodiment it is necessary to use means such as shown in FIG. 8 for ensuring proper movement of the guard cup 63 when the plunger is moved between its operating positions.

With reference to leak detection and the functioning of the two sealing members of the plunger, the upper seal is the one that prevents any leakage through the interchange during a meter proving run. Assuming that space 33 between sealing members 27 and 28 is vented for leak detection, imperfect sealing of member 28 does not prevent proper leak detection because of the seal established by the underlying sphere. Also an approximate seal between the lower member 28 and sleeve 15 is sufficient to move an underlying liquid column downwardly when the plunger moves into the sleeve.

We claim:

1. In liquid meter proving apparatus, a metering pipe having flow inlet and outlet ends and adapted to receive flow-propelled spheres and interchange means connecting the inlet and outlet ends and adapted to receive spheres from the outlet end and to selectively transfer the same to the inlet end, said interchange means comprising a cylindrical sleeve having sphere receiving inlet and sphere delivery outlet ends, the sleeve having an internal diameter such that a sphere may pass through the same with a seal-forming fit, the length of the sleeve being sufficient to accommodate two adjacent spheres, a plunger movable from a retracted position spaced axially from the inlet end of the sleeve to a projected position within the sleeve, the plunger having sealing means forming a seal-forming fit with respect to the surfaces of the sleeve, and means for reciprocating the plunger between a projected position within and in sealing engagement with the sleeve and said retracted position, the plunger when retracted enabling a sphere received from the outlet end of the metering pipe to move to a position adjacent the inlet end of the sleeve, and when moved from retracted to a projected position within the sleeve and in sealing engagement therewith serving to force the last named sphere into the sleeve and to dislodge another sphere left within the sleeve at the end of full retraction of the plunger, thereby launching said another sphere into the inlet end of the metering pipe, said plunger when moved toward retracted position from its projected position, after a launching, serving to apply suction to the sphere within the sleeve whereby such sphere is moved to a position nearer the inlet end of the sleeve.

2. Apparatus as in claim 1 in which the interchange means includes a flow-tee connected between the outlet end of the metering pipe and that portion of the interchange communicating with the inlet end of the sleeve, an outlet flow pipe connected to the lower side of said flow-tee, sloped ramp means for causing a sphere within the flow-tee to move by gravity toward said portion of the interchange, and means within one side of the flow-tee serving laterally to deflect a sphere passing through the same to prevent dwell of the sphere in a region where said outlet pipe connects with the same.

3. Apparatus as in claim 1 together with sphere blocking guard means, said guard means serving to prevent movement of a sphere into a position in the path of movement of the plunger when the plunger is moved to said projected position and being moved to an out-of-the-way position when the plunger is moved to said retracted position.

4. Apparatus as in claim 3 in which the plunger is carried by a reciprocatable rod and the guard means is also slidably carried by the rod.

5. Apparatus as in claim 3 in which the guard means is mounted for pivotal movement between guard engaging and out-of-the-way positions.

6. Apparatus as in claim 1 in which one end of the plunger is provided with an annular member for engaging said adjacent sphere over an annular area concentric with the axis of the sleeve to force the same into the sleeve.

7. A liquid meter proving method making use of a metering pipe having its inlet and outlet ends connected to sphere receiving and sphere launching portions of an interchange, the spheres being flow-propelled through the metering pipe during a metering run, the interchange including a cylindrical sleeve connected between the sphere receiving and sphere launching portions of the interchange, the sleeve having substantially the same internal diameter as that of the metering pipe, the interchange also having a plunger adapted to form a seal with the sleeve when within the same and movable between a projected position within the sleeve to a retracted position spaced from the sleeve and within the sphere receiving portion, the steps, starting with only two superposed spheres within the sleeve, comprising moving the plunger to its projected position to move both spheres axially of the sleeve and to cause one sphere to be displaced from the sleeve into the sphere launching portion of the interchange whereby the sphere is caused to enter the inlet end of the metering pipe with the other one of the two spheres being retained adjacent to the plunger in the sleeve, holding the plunger in its projected position in sealing engagement with the sleeve while the launched sphere is being flow-propelled through the metering pipe, retrieving the launched sphere after it has been flow-propelled through the metering pipe and means causing it to be selectively positioned in a flow tee adjacent to the sphere receiving portion of the interchange, moving the plunger within the sleeve toward retracted position and simultaneously moving the retained sphere by the plunger suction to a position within the sleeve nearer to the sphere receiving portion of the interchange, further moving the plunger to its retracted position while the sphere in the sleeve remains in sealed relationship therewith thereby causing the retrieved sphere to move to a position between the plunger and the inlet end of the sleeve, and then moving the plunger toward its projected position to move the retrieved sphere into the sleeve and to move the previously retained sphere to a position nearer to the sphere launching portion of the interchange.

8. A method as in claim 7 in which a sphere leaving the outlet end of the metering pipe is caused to move by gravity toward the sphere receiving portion of the interchange.

* * * * *